(12) United States Patent
Pivowar et al.

(10) Patent No.: US 11,261,978 B2
(45) Date of Patent: Mar. 1, 2022

(54) ANNULUS SAFETY VALVE SYSTEM AND METHOD

(71) Applicant: Cameron International Corporation, Houston, TX (US)

(72) Inventors: Jason M. Pivowar, Houston, TX (US); Delbert Vanderford, Cypress, TX (US); Moyosore Terebo, Katy, TX (US); Kristin D. Vorderkunz, Plano, TX (US)

(73) Assignee: Cameron International Corporation, Houston, TX (US)

( * ) Notice: Subject to any disclaimer, the term of this patent is extended or adjusted under 35 U.S.C. 154(b) by 91 days.

(21) Appl. No.: 16/366,902

(22) Filed: Mar. 27, 2019

(65) Prior Publication Data
US 2020/0308925 A1    Oct. 1, 2020

(51) Int. Cl.
| E21B 34/02 | (2006.01) |
| F16K 17/04 | (2006.01) |
| F16K 31/122 | (2006.01) |
| F16K 41/00 | (2006.01) |
| F16K 15/02 | (2006.01) |

(52) U.S. Cl.
CPC ............ F16K 15/026 (2013.01); E21B 34/02 (2013.01); F16K 17/04 (2013.01); F16K 31/1221 (2013.01); F16K 41/00 (2013.01)

(58) Field of Classification Search
CPC .... F16K 15/026; F16K 17/04; F16K 31/1221; F16K 41/00; E21B 344/02
See application file for complete search history.

(56) References Cited

U.S. PATENT DOCUMENTS

| 3,466,001 | A |   | 9/1969  | Nelson |
| 1,662,603 | A |   | 5/1987  | Etheridge |
| 5,918,627 | A | * | 7/1999  | Oshiro ................... F16K 17/04 |
|           |   |   |         | 137/508 |
| 3,050,338 | A |   | 4/2000  | Watkins |
| 6,086,039 | A | * | 7/2000  | Sievers ............... F16K 31/1221 |
|           |   |   |         | 251/61.5 |
| 7,566,045 | B2 |  | 7/2009  | June |
| 8,181,705 | B2 |  | 5/2012  | Tveiten et al. |
| 8,186,440 | B2 |  | 5/2012  | Tveiten et al. |
| 8,640,776 | B2 |  | 2/2014  | Tveiten et al. |
| 8,684,073 | B2 |  | 4/2014  | Sevheim et al. |
| 9,422,789 | B2 | * | 8/2016  | Bushman ................ E21B 34/04 |
| 9,500,062 | B2 |  | 11/2016 | Tveiten et al. |
| 2002/0020558 | A1 | | 2/2002 | Gonzalez et al. |

(Continued)

FOREIGN PATENT DOCUMENTS

| GB | 2132728 A    | 7/1984 |
| WO | 2018106119 A2 | 6/2018 |

*Primary Examiner* — Kevin R Barss
(74) *Attorney, Agent, or Firm* — Eubanks PLLC (57) ABSTRACT

An apparatus includes a valve having a hollow body and an inner sealing assembly positioned in the hollow body. The inner sealing assembly includes a piston and can be moved between an open position and a closed position to selectively control flow along a flow path through the valve. The flow path includes a bore of the piston that allows flow through the piston, and pressure within the valve from a fluid in the flow path within the valve biases the inner sealing assembly toward the closed position to stop flow through the valve. Additional systems, devices, and methods are also disclosed.

18 Claims, 10 Drawing Sheets

(56) References Cited

U.S. PATENT DOCUMENTS

| | | | |
|---|---|---|---|
| 2009/0020382 A1* | 1/2009 | Van Weelden | F16F 9/465 |
| | | | 188/282.2 |
| 2010/0044054 A1 | 2/2010 | de Boer | |
| 2012/0222760 A1 | 9/2012 | Marica | |
| 2015/0345253 A1 | 12/2015 | Braekke | |
| 2017/0037980 A1 | 2/2017 | Arian et al. | |
| 2017/0284277 A1* | 10/2017 | Wardle | F01M 1/16 |
| 2018/0010420 A1 | 1/2018 | Shirley et al. | |

* cited by examiner

ANNULUS SAFETY VALVE SYSTEM AND METHOD

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, wellhead components, trees, valves, fluid conduits, and the like, that control drilling or extraction operations.

Various wellhead assembly components and other oilfield components can include ports for accessing internal volumes. A wellhead can include outlet ports in fluid communication with various annuluses in the well, for example. External valves, such as gate valves, can be attached to the side of the wellhead to control flow through the outlet ports. In some instances, a plug may be installed through an external valve and threaded into an outlet port to seal the outlet port and allow the external valve to be removed from the wellhead.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Certain embodiments of the present disclosure generally relate to valve assemblies for controlling flow into or out of a wellhead, tree, or other oilfield component. In some embodiments, a valve includes an inner sealing assembly that moves between an open position and a closed position within a hollow body to selectively control flow through the valve. The inner sealing assembly can include a piston coupled to a sealing poppet. In at least some embodiments, fluid along a flow path through the valve applies a net biasing force on the inner sealing assembly toward the closed position. Control fluid may be routed into a control chamber within the valve to overcome the biasing force and drive the inner sealing assembly toward the open position. In some instances, the valve can be installed as an annulus safety valve in an annulus outlet port of a wellhead, but the valve could be used for other applications.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
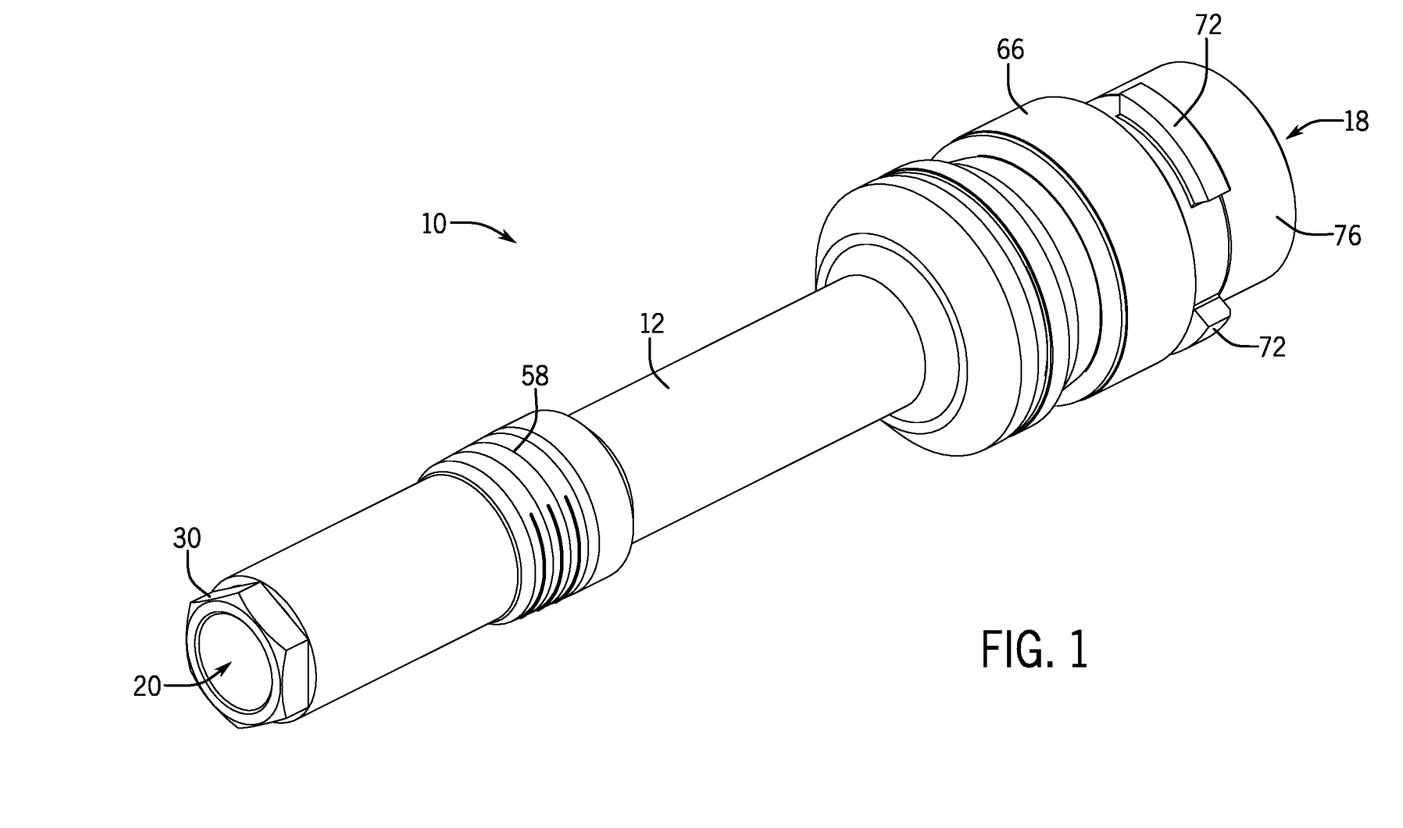
FIG. 1 is a perspective view of a valve that can be installed in a port of a wellhead or other oilfield component in accordance with an embodiment of the present disclosure.
Figure 2:
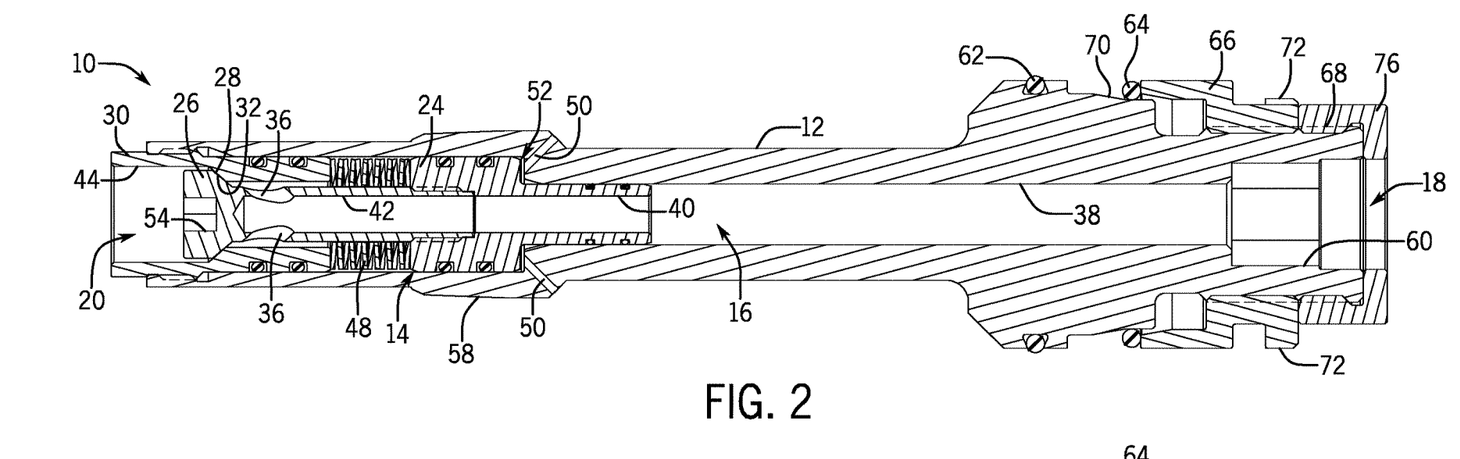
FIG. 2 is a cross-section of the valve of FIG. 1 and shows an inner sealing assembly of the valve in a closed position in accordance with one embodiment.
Figure 3:
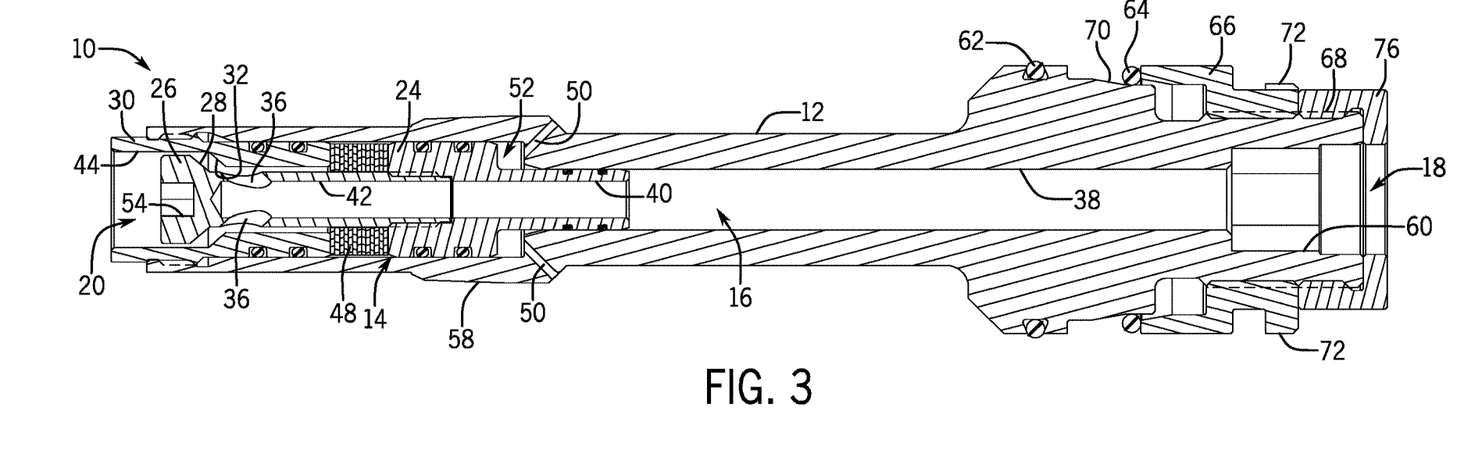
FIG. 3 is a cross-section of the valve of FIG. 1 and shows the inner sealing assembly of the valve in an open position in accordance with one embodiment.

Turning now to the present figures, an example of a valve 10 is provided in FIGS. 1-3 in accordance with one embodiment. In at least some instances, the valve 10 may be used as an annulus safety valve installed in a port of a wellhead to control access to an annulus within a well, but the valve 10 may be used in different applications in other instances. The valve 10 includes a hollow body 12 housing an inner sealing assembly 14. The valve 10 also includes a flow path 16 between ends of the valve 10, and the inner sealing assembly 14 can be moved within the hollow body 12 (which may also be referred to as an outer housing) to selectively control flow along the flow path 16 through the valve 10. For explanatory purposes, the flow path 16 may be considered to extend from a valve inlet 18 to a valve outlet 20. But it will be understood that fluid may travel through the valve 10 along the flow path 16 in either direction, and that element 20 may instead be considered a valve inlet and element 18 considered a valve outlet.

As shown in FIGS. 2 and 3, the inner sealing assembly 14 includes a piston 24 coupled to a poppet 26. The inner sealing assembly 14 may be moved between a closed position, as shown in FIG. 2, and an open position, as shown in FIG. 3. In the presently depicted embodiment, the valve 10 also includes a seat 30 installed in the hollow body 12. The poppet 26 includes a sealing surface 28 that seals against a mating sealing surface 32 of the seat 30 when the inner sealing assembly 14 is in the closed position. In at least some embodiments, the sealing surfaces 28 and 32 are metal sealing surfaces such that the valve 10 provides a metal-to-metal seal that prevents flow through the valve when the inner sealing assembly 14 is in the closed position. In some other embodiments, a seal formed of polytetrafluoroethylene, some other thermoplastic, an elastomer, or another suitable material may also or instead be provided to seal between the surfaces 28 and 32. Additionally, while the valve 10 is depicted as having a seat 30 including the mating sealing surface 32, in at least some additional embodiments the seat 30 is omitted and the sealing surface 28 of the poppet 26 seals against some other mating sealing surface (e.g., a mating sealing surface of the hollow body 12).

The poppet 26 is shown in FIGS. 2 and 3 as having two ports 36 allowing fluid to flow into or out of the poppet 26, but other embodiments could include some other number of ports 36. When the inner sealing assembly 14 is moved to the open position depicted in FIG. 3, fluid may flow along the flow path 16 between the inlet 18 and the outlet 20 (i.e., through a bore 38 of the hollow body 12, a bore 40 of the piston, a bore 42 of the poppet 26, the ports 36 of the poppet 26, an annular chamber surrounding the poppet 26, and a bore 44 of the seat 30). Again, the direction of flow could be reversed, with fluid entering the left end of the valve in FIG. 3 and flowing past the poppet head having the sealing surface 28, into the bore 42 of the poppet 26 through the ports 36, and then from the bore 42 through the bore 40 of the piston 24 and the bore 38 of the hollow body 12.

As noted above, the position of the inner sealing assembly 14 within the hollow body 12 controls flow through the valve 10. In at least some embodiments, the valve 10 includes at least one spring 48 that biases the inner sealing assembly 14 toward the closed position. For example, in FIGS. 2 and 3 the valve 10 is shown as including disc springs 48 that apply a biasing force (toward the right in FIGS. 2 and 3) against the piston 24, but different types of springs may be used in other embodiments.

The valve 10 also includes a control chamber 52 for actuating the inner sealing assembly 14 to allow fluid flow. As will be appreciated, the control chamber 52 can be isolated from other chambers or regions within the valve 10 by various seals. In FIGS. 2 and 3, for example, seals are provided between the piston 24 and the hollow body 12 to prevent leaking of control fluid from the control chamber 52 into other portions of the valve 10. The valve 10 is a hydraulic valve in at least some instances, and a hydraulic control fluid may be routed into the control chamber 52 through one or more ports 50 in the hollow body 12 to pressurize the control chamber 52 and drive the piston 24 (and the rest of the inner sealing assembly 14) toward the open position so as to allow flow through the valve 10 along the flow path 16.

The components of the valve 10 can be assembled in any suitable manner. As depicted in FIGS. 2 and 3, for instance, the seat 30 can be threaded into the hollow body 12 and the poppet 26 can be threaded to the piston 24. Additionally, any of the valve components could include features to facilitate assembly. By way of example, the seat 30 is shown as having a hex-head profile in FIG. 1 and the poppet 26 is shown as having a tool recess 54 (e.g., a hex-head recess) in FIGS. 2 and 3. In certain other embodiments, the valve 10 is assembled without threaded connections, such as with any of various breech lock couplings, detents, latches, keys, pins, set screws, or the like.

To facilitate installation of the valve 10, the hollow body 12 includes an exterior threaded surface 58. The valve 10 can be connected to another component (e.g., a wellhead, tree, or some other oilfield component) via the threaded surface 58 and a mating threaded surface of the other component. In at least some embodiments, such as depicted in FIGS. 1-3, the threaded surface 58 is a tapered surface. Further, in at least some instances engagement of the threaded surface 58 with the mating threaded surface of the other component creates a metal-to-metal seal. In one embodiment, for instance, the valve 10 is threaded into an annulus outlet port of a wellhead so that the threaded surface 58 engages a mating thread (e.g., a valve-removal (VR) preparation) of the outlet port to create a metal-to-metal seal between the two threaded surfaces. The valve 10 can include a tool recess 60 (e.g., a hex-head recess) to facilitate threading of the valve 10 into the port via the threaded surface 58.

Moreover, in some embodiments the valve 10 is installed in a port through a bore of another component, such as a flange or spool, coupled to the oilfield component having the port. It will be appreciated that any suitable running tool may be used to run the valve 10 through the bore of the other component and to install the valve 10 in the port of the oilfield component. When installed, the valve 10 may protrude from the port of the oilfield component and extend into the bore of the other component. Consequently, the valve 10 is depicted in FIGS. 2 and 3 as having seals 62 and 64 for sealing between the valve 10 and the bore wall of the other component. Seal 62 is shown being held in a seal groove of the hollow body 12, while seal 64 may be moved along the body 12 to energize the seal after installing the valve 10. More specifically, the valve 10 includes an energizing sleeve 66 threaded onto a mating threaded surface 68 of the hollow body 12. After the valve 10 is installed into a port of a tree, wellhead, or other oilfield component, the energizing sleeve 66 may be rotated to drive the seal 64 up an inclined surface 70 of the body 12 to its energized position (see, e.g., FIG. 4). The energizing sleeve 66 is depicted as having a tool interface, such as castellations 72, to facilitate rotation of the energizing sleeve 66 on the threaded surface 68 of the hollow body 12 with a tool. Additionally, the depicted valve 10 includes a retaining ring 76 threaded onto the threaded surface 68 to prevent inadvertent unthreading of the energizing sleeve 66 off the hollow body 12. Although shown with both seals 62 and 64, either of these seals may be omitted in other embodiments.

Figure 4:
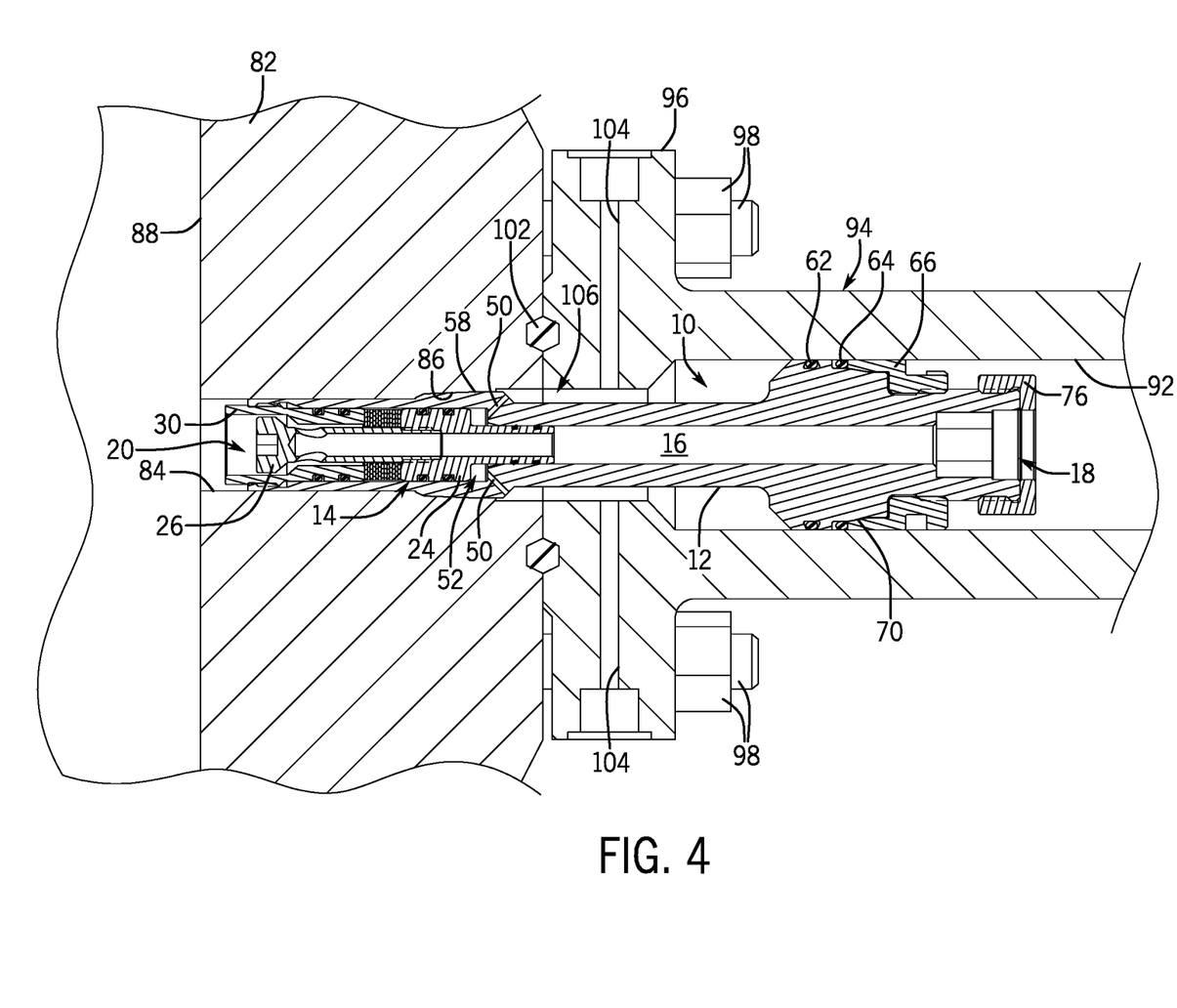
FIG. 4 depicts the valve of FIG. 1 installed in a port of an oilfield component and in a spool coupled to the oilfield component in accordance with one embodiment.

As discussed above, the valve 10 can be installed in a port of an oilfield component. One example of this is depicted in FIG. 4, in which the valve 10 is installed in a port 84 of an oilfield component 82. While the valve 10 could be installed in a variety of oilfield components, in at least some embodiments the valve 10 is installed in a port of a wellhead, a tree, or other equipment mounted over the wellhead. As used herein, "wellhead body" encompasses wellhead components, as well as other components mounted above a wellhead (e.g., wellhead stack equipment mounted above a wellhead and trees mounted above a wellhead). More specifically, in some embodiments the valve 10 can be deployed as an annulus safety valve that is installed in a port 84 of a wellhead to control access to an annulus within the well. And in at least one embodiment, three valves 10 may be installed in three ports 84 of a wellhead to control access to three different annuluses within the well (e.g., an "A" annulus, a "B" annulus, and a "C" annulus).

The valve 10 may be installed by rotating the valve 10 to thread the valve 10 into the port 84 by engaging the threaded surface 58 of the hollow body 12 with a mating threaded surface 86 of the oilfield component 82. In at least some embodiments, the port 84 is an annulus outlet port of a wellhead and the mating threaded surface 86 includes a VR preparation for the port 84. The port 84 is depicted in FIG. 4 as a lateral port in fluid communication with a bore 88 of the oilfield component 82 (e.g., a vertical bore or main bore).

As shown in FIG. 4, the valve 10 extends outwardly from the port 84 into a through bore 92 of a spool 94 that is attached to the oilfield component 82 via a flange 96 and fasteners 98 (e.g., nuts and studs). The other end of the spool 94 may be connected to a gate valve or other equipment (e.g., with another flanged connection). In other embodiments, a separate flange (e.g., an instrument flange) may be installed in place of the spool 94 (in which case one or more gate valves or other equipment can be connected to the separate flange) or between the spool 94 and the oilfield component 82.

The spool 94 is arranged such that its through bore 92 is aligned with (i.e., inline with) the port 84. The valve 10 may be installed in the port 84 by running the valve 10 to the port 84 through the through bore 92 of the spool 94 and then rotating the valve 10 to thread the valve 10 into the port 84 via mating threaded surfaces 58 and 86. The energizing sleeve 66 can then be rotated to drive the seal 64 up the inclined surface 70 to the position shown in FIG. 4. As also noted above, this running and rotation of the valve 10 and its components may be performed with a suitable running tool in at least some embodiments. In some instances, installing the valve 10 may also include running the valve 10 into the through bore 92 by first passing the valve 10 through one or more gate valves or other equipment connected to an end of the spool 94.

A seal 102, such as a metal ring gasket, is positioned to seal against opposing faces of the oilfield component 82 and the flange 96. In operation, control fluid may be pumped through one or more ports 104 of the flange 96 into an inner cavity 106. The cavity 106 may be provided in various forms, but in FIG. 4 the cavity 106 is a generally annular cavity outside the valve 10 within the oilfield component 82 and the spool 94. As depicted in FIG. 4, the cavity 106 includes a portion of the port 84 (i.e., to the right of the threaded surface 58) and a portion of the through bore 92 of the spool 94 (i.e., to the left of the seal 62). Additionally, the seal 102 surrounds the cavity 106 and is positioned to prevent leakage from the cavity 106 between the oilfield component 82 and the flange 96 during normal operation. The cavity 106 is in fluid communication with the control chamber 52 of the valve 10, such as through the ports 50 in the hollow body 12. In this arrangement, the inner sealing assembly 14 can be actuated by pumping control fluid into the control chamber 52, via a port 104 (of the flange 96) and the cavity 106, to overcome closing biasing forces and drive the inner sealing assembly 14 to the open position to allow flow through the valve. For example, control fluid may be used to open the valve 10 and allow another fluid to be injected into a well through the valve 10, the port 84, and the bore 88, or to allow another fluid to flow out of a well (e.g., from an annulus) through the bore 88, the port 84, and then the valve 10.

The springs 48 within the valve 10 can apply a closing biasing force against the piston 24, as noted above. But in at least some embodiments, including that depicted in FIGS. 1-4, the valve 10 is constructed such that, during operation, pressure of fluid within the valve 10 outside of the control chamber 52 can also apply a net biasing force on the inner sealing assembly 14 toward the closed position. In the example depicted in FIGS. 1-4, for instance, a fluid injected into the valve 10 through the inlet 18 (i.e., from the upstream side of the valve 10) when the inner sealing assembly 14 is in the closed position would flow out through the ports 36 of the poppet 26 into a chamber that is between the piston 24 and the sealing surface 28 and that surrounds the poppet 26. The pressure of the injected fluid in the flow path 16 (which includes the chamber outside the poppet 26 between the piston 24 and the sealing surface 28) applies forces on the surfaces contacted by the fluid. But while the pressurized fluid in the flow path 16 applies some force on the poppet 26 toward the open position, this pressurized fluid also applies a larger force on the piston 24 (noting the larger diameter of the piston 24 exposed to the fluid near spring 48 compared to the diameter of the poppet 26 exposed to the fluid). As a result, the injected fluid causes a net biasing force on the inner sealing assembly 14 toward the closed position. As the pressure of the injected fluid increases, so would the net biasing force from the injected fluid toward the closed position.

When the inner sealing assembly 14 is in the closed position, the seal formed between the mating surfaces 28 and 32 holds pressure from both the upstream direction, as discussed above, and the downstream direction. More specifically, pressure of a fluid at the outlet 20 of the valve 10 (e.g., wellbore pressure from bore 88 of a wellhead body) pushes the exposed end face of the poppet 26 and biases the inner sealing assembly 14 toward the closed position. As both upstream pressure and downstream pressure apply a net biasing force on the inner sealing assembly 14 (unlike other valves that have different upstream and downstream sealing surfaces), in at least some embodiments the ability of the valve 10 to seal against downstream pressure at the outlet 20 is tested by pressuring the upstream side of the valve 10 through the inlet 18. For example, positive sealing in response to upstream pressure indicates the that the sealing surfaces are also capable of sealing against downstream pressure.

From the discussion above, it will be appreciated that the inner sealing assembly 14 generally remains in the closed position unless the pressure of control fluid in the control chamber 52 is high enough to overcome the closing biasing forces and drive the inner sealing assembly 14 toward the open position. The control chamber 52 is in fluid communication with the cavity 106, and seal 102 prevents leakage of control fluid between the flange 96 and the oilfield component 82 from the cavity 106, as also noted above. The seal 102 serves as a second fluid barrier, in addition to the sealing engagement of threaded surfaces 58 and 86, against egress of fluid from the port 84 of the oilfield component 82.

Figure 5:
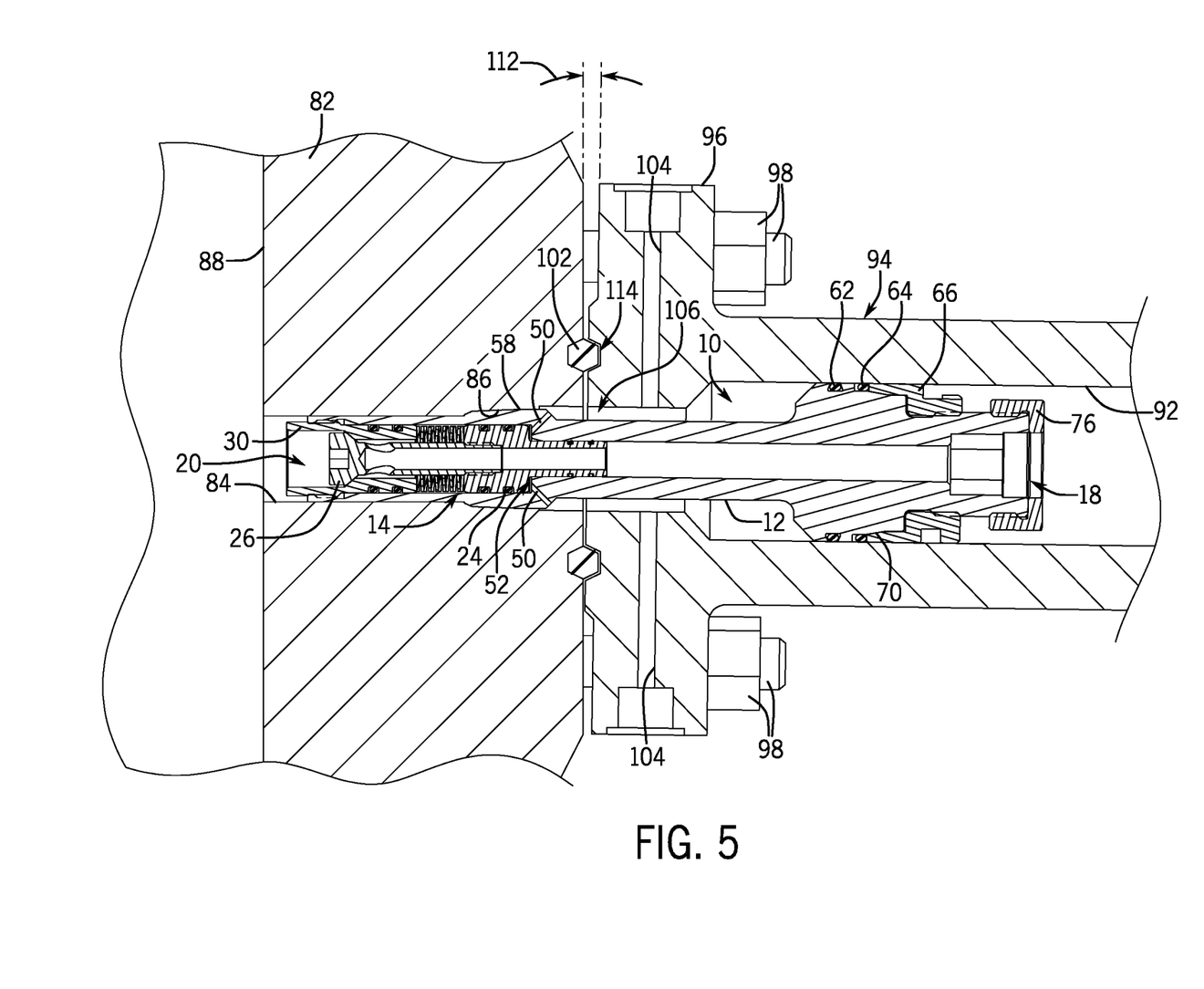
FIG. 5 depicts the valve of FIG. 4 closed during deflection of the spool from the oilfield component in accordance with one embodiment.

In some instances, the flange 96 may be deflected away from the oilfield component 82 such that the seal 102 no longer maintains a seal between the opposing faces of the flange 96 and the oilfield component 82. This deflection can be caused by a dropped object or a side impact from a vehicle or crane, for instance. An example of such deflection is generally depicted in FIG. 5, in which the flange 96 is deflected away from the oilfield component (the deflection generally represented by angle 112), creating a gap or leak path 114 past the seal 102. The control fluid leaks from the control chamber 52 and the cavity 106 through the gap 114, and the resulting depressurization of the control chamber 52 allows the biasing forces (from spring 48 and fluid pressure in the valve 10 outside the control chamber 52) to push the inner sealing assembly 14 back into the closed position. Thus, the valve 10 can close in response to loss of sealing integrity caused by separation of the flange 96 from the oilfield component 82. This contrasts with some other valve designs that are not responsive to loss of sealing integrity between a flange and oilfield component.

Figure 6:
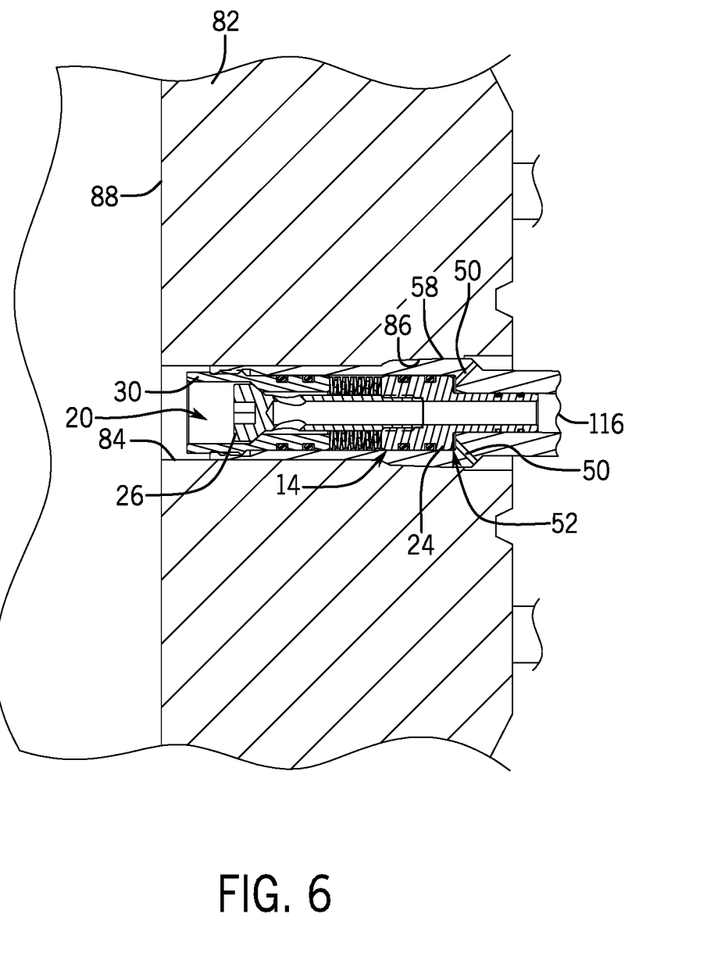
FIG. 6 depicts the valve of FIG. 4 closed following separation of the spool from the oilfield component in accordance with one embodiment.

In rare cases, a sizable external force may be large enough to break the spool 94 off the oilfield component 82, such as by shearing or stripping fasteners 98. In such cases, the valve 10 may shear to allow part of the valve 10 to remain in the port 84 and seal against downstream pressure within the port 84. One example of this is shown in FIG. 6, in which the spool 94 has broken away from the oilfield component 82, taking a portion of the valve 10 with it and leaving a portion of the valve 10 with a sheared end surface 116. The valve 10 is a fail-safe closed valve and, without a pressurized control chamber 52, the inner sealing assembly 14 moves to (or remains in) the closed position to prevent fluid flow through the sheared valve 10.

By way of further example, a valve 120 is depicted in FIGS. 7-10 in accordance with another embodiment. Like the valve 10, the valve 120 includes a hollow body 122 housing an inner sealing assembly 124 that can be moved between open position (FIG. 9) and a closed position (FIG. 10) to selectively control flow along a flow path 126 through the valve 120 from inlet 128 to outlet 130. The inner sealing assembly 124 includes a piston 134 connected to a poppet 136. And like the inner sealing assembly 14 of the valve 10, the inner sealing assembly 124 of at least some embodiments is biased closed and seals against both upstream and downstream pressure.

Figure 10:
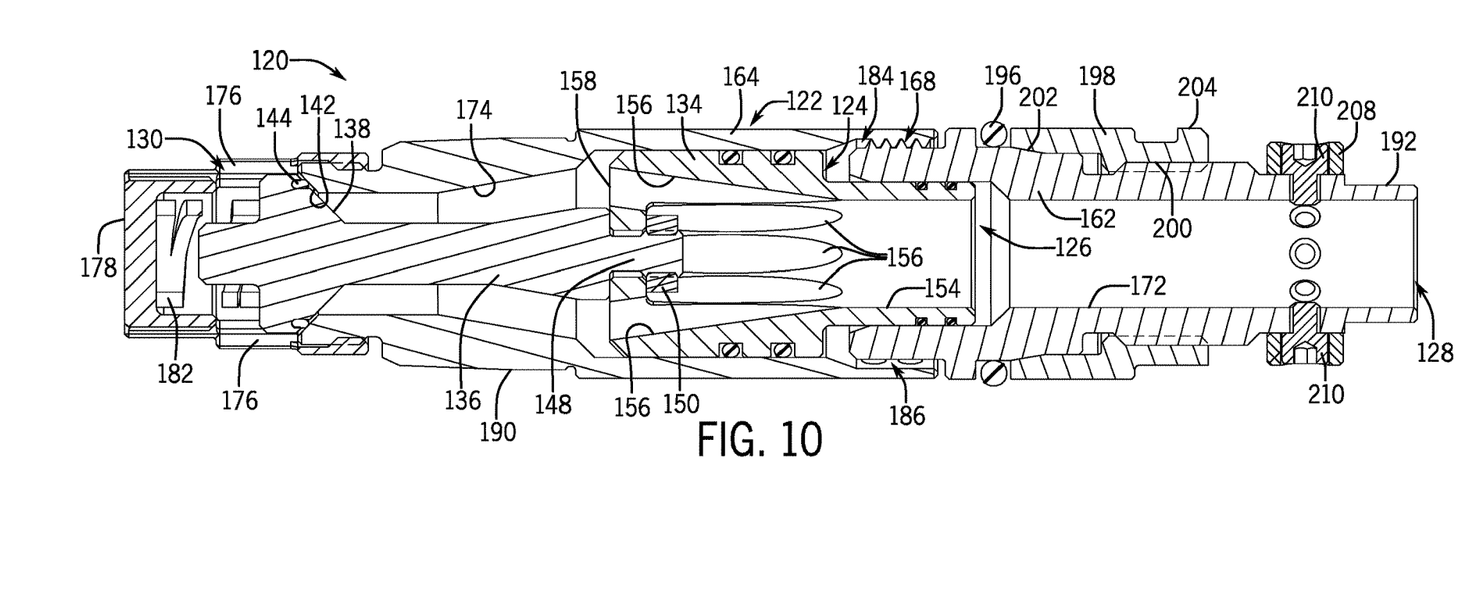
FIG. 10 is a cross-section of the valve of FIG. 7 and shows the inner sealing assembly of the valve in a closed position in accordance with one embodiment.

The poppet 136 includes a seating surface 138. In the presently depicted embodiment, a seal 144 (e.g., a polytetrafluoroethylene seal, some other thermoplastic seal, or an elastomer seal) is provided in the seating surface 138 and seals against the seating surface 138 and a mating sealing surface 142 when the inner sealing assembly 124 is in the closed position, such as shown in FIG. 10. The mating sealing surface 142 may be provided as a surface of the hollow body 122 or by a seat installed in the hollow body 122. In at least some embodiments, the seal 144 may compress when the inner sealing assembly 124 is in the closed position such that the seating surface 138 also seals directly against the mating sealing surface 142 (e.g., for a metal-to-metal seal). In other embodiments, the seal 144 could be omitted and the seating surface 138 alone could seal directly against the mating sealing surface 142.

Figure 9:
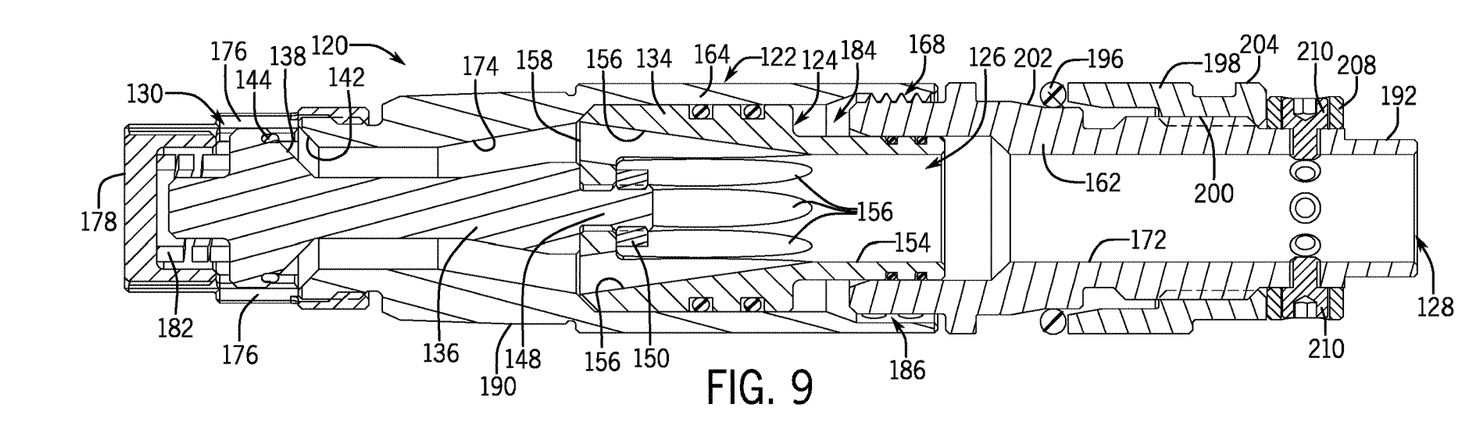
FIG. 9 is a cross-section of the valve of FIG. 7 and shows an inner sealing assembly of the valve in an open position in accordance with one embodiment.

In FIGS. 9 and 10, the poppet 136 is shown connected to the piston 134 by a retaining nut 150 threaded onto a stem 148 of the poppet 136 that extends through an aperture of the piston 134, but the poppet 136 and piston 134 could be joined in other suitable manners. The piston 134 includes a bore 154 to allow fluid flowing along the flow path 126 to flow through the piston 134. Rather than routing fluid into a bore of the poppet 136, the bore 154 of the piston 134 diverges into ports 156 that extend to a front face 158 of the piston 134 such that the fluid flows from the piston 134 into a generally annular chamber surrounding the poppet 136.

Figure 7:
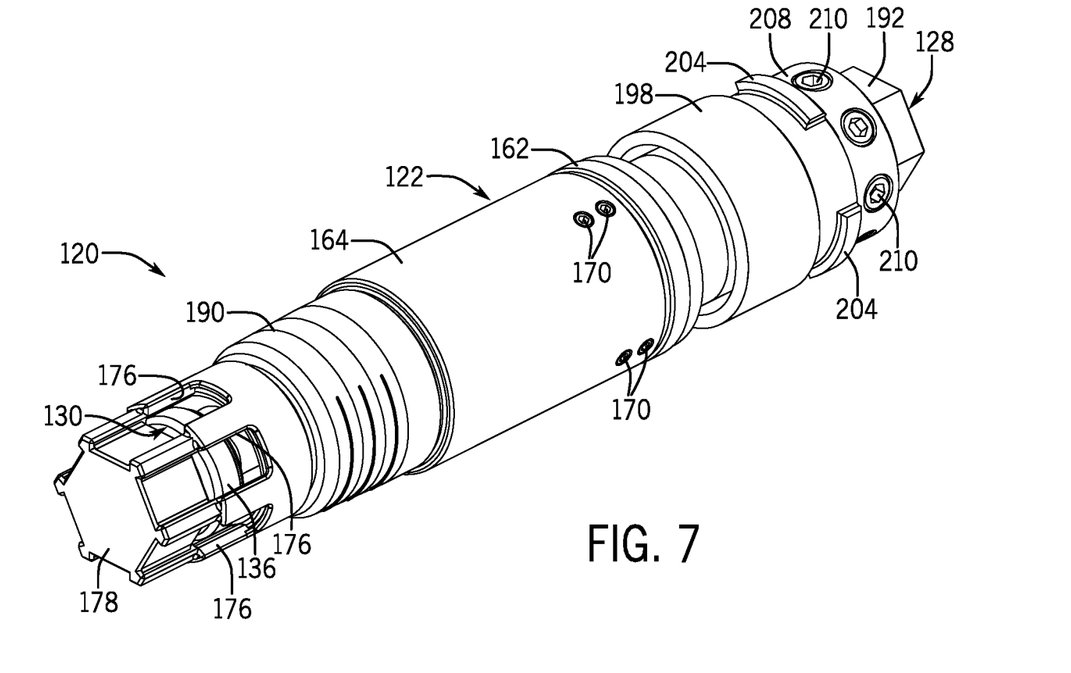
FIG. 7 is a perspective view of another valve that can be installed in a port of a wellhead or other oilfield component in accordance with one embodiment.
Figure 8:
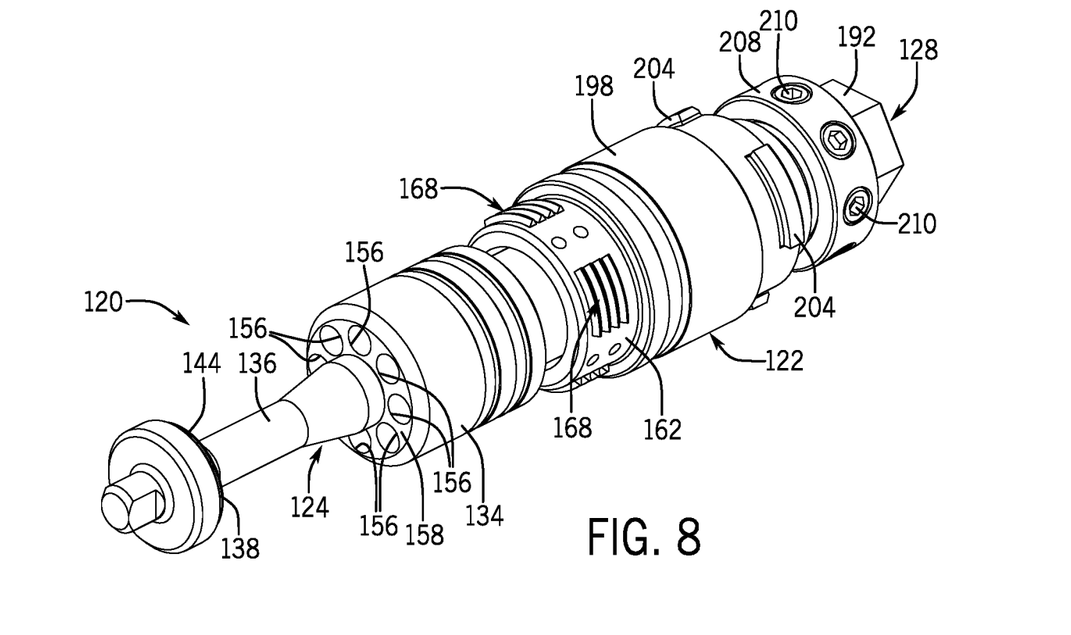
FIG. 8 shows the valve of FIG. 7 with a portion of a hollow body of the valve removed to show interior details of the valve in accordance with one embodiment.

While the hollow body 12 of the valve 10 is depicted in FIGS. 1-3 as a one-piece body, the hollow body 122 (which may also be referred to as an outer housing) is depicted in FIGS. 7,9, and 10 as a two-piece body having a first body portion 162 and a second body portion 164. The second body portion 164 is omitted in FIG. 8 to better show certain internal aspects of the valve 120. The first and second body portions 162 and 164 can be connected in any suitable manner. Although the body portions 162 and 164 could be threaded together, in other embodiments these two body portions are coupled without threads. For instance, as depicted in FIGS. 8-10, the body portions 162 and 164 can be coupled via mating ridges 168 (e.g., of a breech lock connection). During assembly, the body portions 162 and 164 may be aligned such that their ridges 168 are rotationally offset from one another, allowing the body portions 162 and 164 to be drawn together. The mating ridges 168 may intermesh via rotation of the body portion 162 with respect to the body portion 164. Set screws 170 may be installed through apertures of the body portion 164 to engage the body portion 162 and inhibit disconnection of the two body portions from each other.

Moving from the inlet 128 to the outlet 130, the flow path 126 through the valve 120 includes bore 172 of the first body portion 162, the bore 154 and ports 156 of the piston 134, and a portion of the bore 174 of the second body portion 164 that extends from the piston 134 to the seating surface 138 of the poppet 136. Fluid flowing from the inlet 128 to the outlet 130 exits the valve 10 via ports 176 (e.g., slots) in a cap 178 attached to the end of the second body portion 164. One or more springs 182 can be installed in the cap 178 to apply a biasing force on the poppet 136 toward the closed position.

In certain embodiments, including the embodiment depicted in FIGS. 7-10, the valve 120 is constructed such that the pressure of fluid from the upstream or downstream directions applies a biasing force on the inner sealing assembly 124 toward the closed position, such as described above for the valve 10. Although the valve 120 is described as having an inlet 128 and outlet 130, it will again be appreciated that the direction of flow could be reversed, with fluid entering the valve through the ports 176 and exiting the valve through the inlet 128.

The valve 120 includes a control chamber 184 for actuating the inner sealing assembly 124 in a manner like that described above with respect to control chamber 52 of valve 10. That is, control fluid (e.g., hydraulic control fluid) may be routed into the control chamber 184 to overcome closing biasing forces and drive the inner sealing assembly 124 toward the open position to allow flow through the valve 120 along the flow path 126. As depicted in FIGS. 9 and 10, the control fluid may be routed into the control chamber 184 through gaps 186 between the first and second body portions 162 and 164.

The hollow body 122 of the valve 120 includes a threaded surface 190 to facilitate installation, such as described above with respect to threaded surface 58 of valve 10. For example, like valve 10, the valve 120 can be connected to another component via the threaded surface 190 and a mating threaded surface of the other component. In some embodiments, the threaded surface 190 is a tapered surface and can form a metal-to-metal seal with the mating threaded surface of the other component. Still further, in at least one embodiment the valve 120 is threaded into an annulus outlet port of a wellhead so that the threaded surface 190 engages a VR preparation or other mating thread of the outlet port to form a metal-to-metal seal between the threaded surfaces. As depicted in FIGS. 7 and 8, the distal end of the hollow body 122 includes a hex-head profile 192 to facilitate threading of the valve 120 into a port of a wellhead or other component. And as with the valve 10, any suitable running tool may be used to run and install the valve 120 through bores of one or more additional components (e.g., flanges, spools, or gate valves) attached to a wellhead or other component receiving the valve 120.

The valve 120 includes a seal 196 and an energizing sleeve 198 threaded onto a mating threaded surface 200 of the hollow body 122. The energizing sleeve 198 may be rotated (e.g., from the position depicted in FIG. 9 to the position depicted in FIG. 10) to drive the seal 196 up an inclined surface 202 of the hollow body 122 to seal between the valve 120 and a bore wall encircling the seal 196 (see, e.g., FIG. 11). The energizing sleeve 198 also includes a tool interface, such as castellations 204, to facilitate rotation of the energizing sleeve 198 with a tool. As presently depicted, the valve 120 also includes a retaining ring 208 that is fastened to the hollow body 122 with cap screws 210 and prevents inadvertent unthreading of the energizing sleeve 198 off the hollow body 122.

Figure 11:
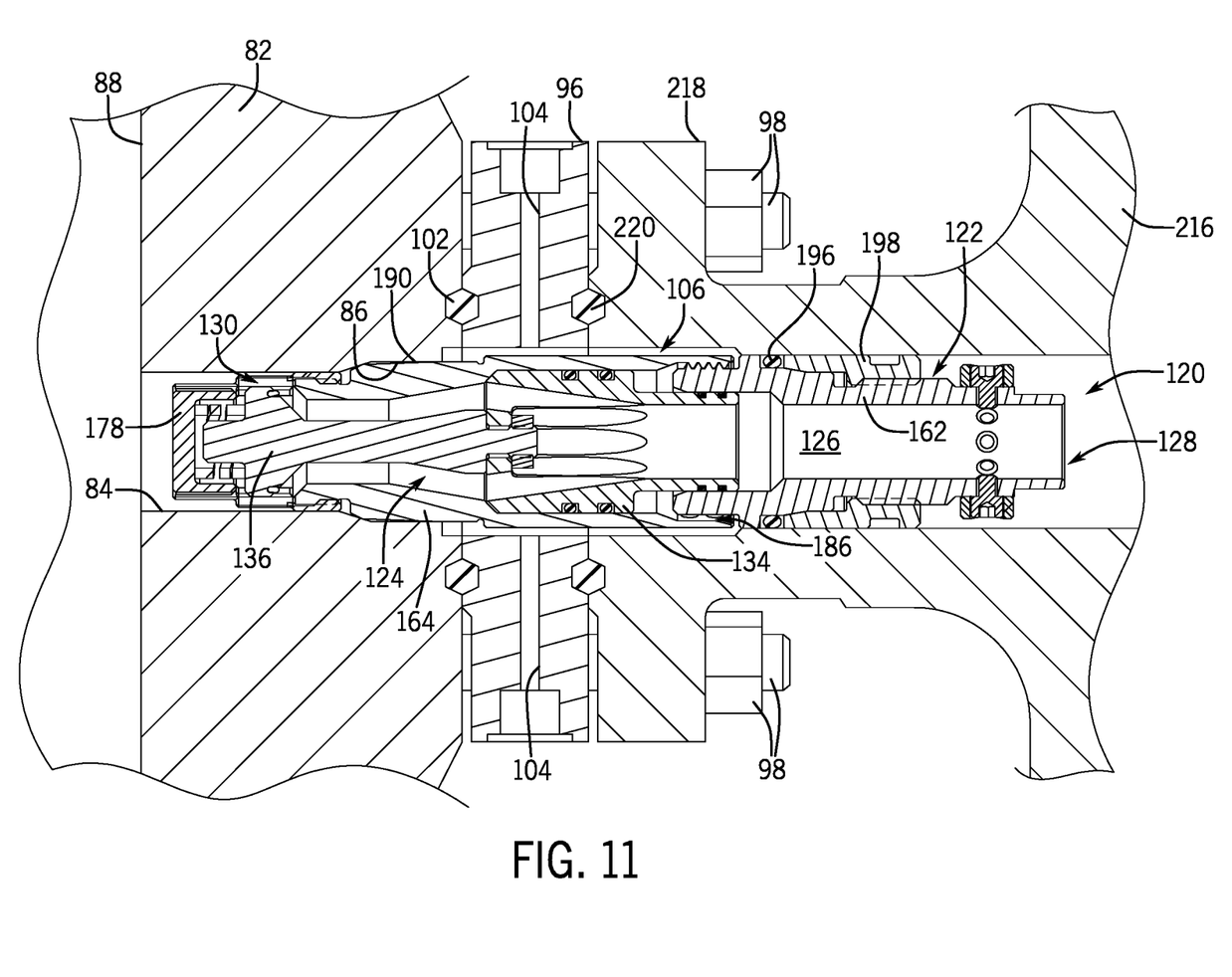
FIG. 11 depicts the valve of FIG. 7 installed in a port of an oilfield component, with an instrument flange and an additional component connected to the oilfield component and the valve extending through the instrument flange into the additional component, in accordance with one embodiment.
Figure 12:
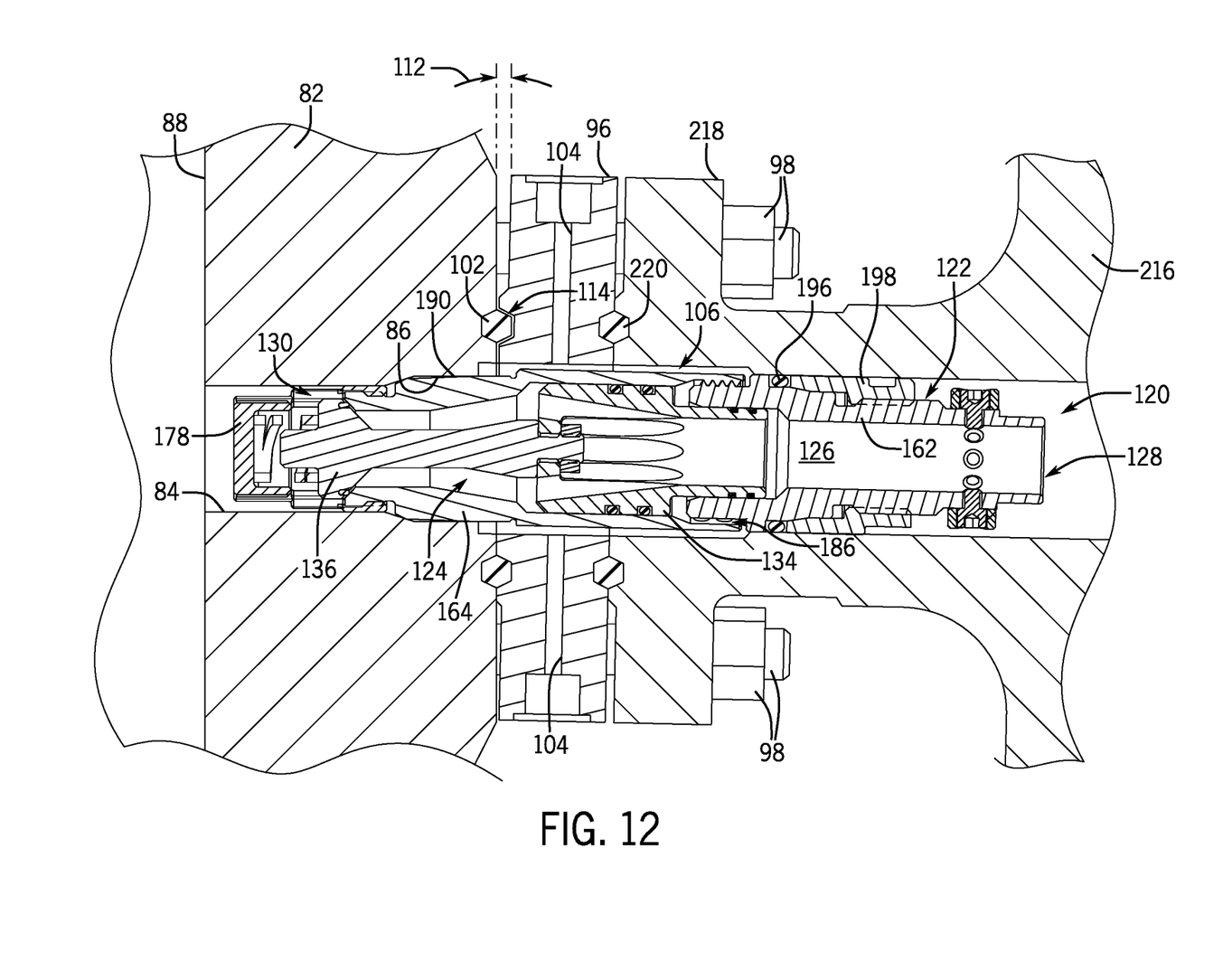
FIG. 12 depicts the valve of FIG. 11 closed during deflection of the instrument flange from the oilfield component in accordance with one embodiment.
Figure 13:
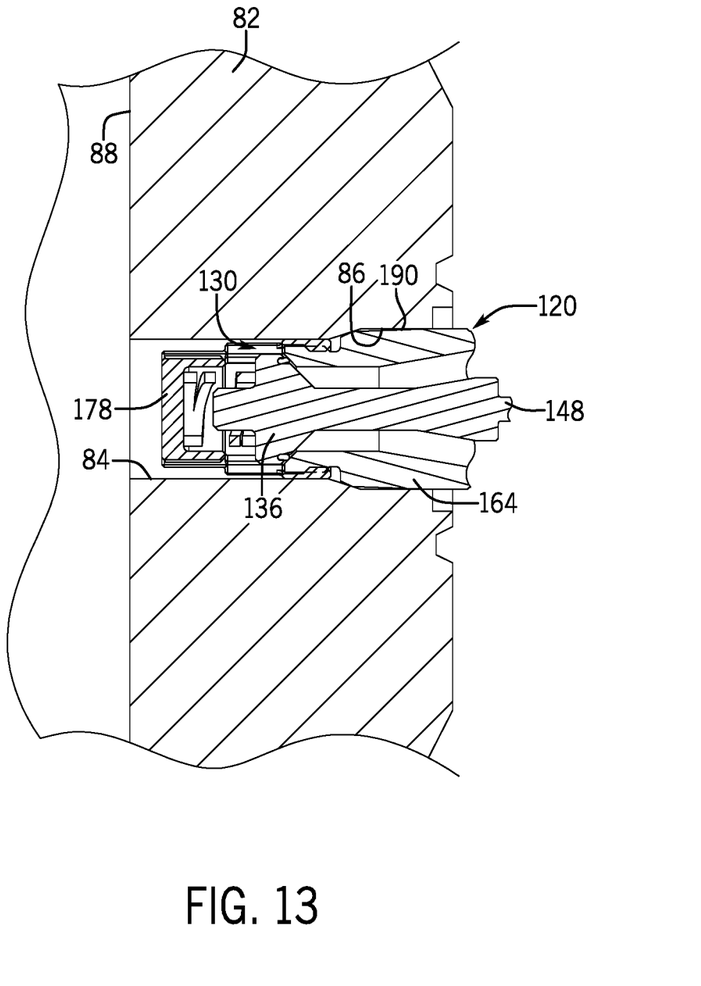
FIG. 13 depicts the valve of FIG. 11 closed following separation of the instrument flange and the additional component from the oilfield component in accordance with one embodiment.

As depicted in FIGS. 11-13, the valve 120 can also be installed in a port 84 of an oilfield component 82 (e.g., as an annulus safety valve installed in an annulus outlet port of a wellhead). Although a single valve 120 is shown in FIGS. 11-13, multiple valves 120 may be installed in multiple ports of a wellhead to control access to different annuluses within the well. The valve 120 may be run through bores of various components aligned with the port 84 and then threaded into the port 84 (e.g., via engagement of the threaded surface 190 with a mating VR preparation of the mating threaded surface 86). As shown in FIG. 11, a flange 96 and an additional component 216 (e.g., a gate valve) are attached to the oilfield component 82 via fasteners 98. In the presently depicted embodiment, the flange 96 is a separate instrument flange interposed between the oilfield component 82 and the additional component 216, which may itself include a flange 218 to facilitate connection. In some embodiments, a spool may be used with or in place of the instrument flange 96. In other embodiments, additional flanges may be installed between the oilfield component 82 and the additional component 216.

Again, as with the valve 10, downstream and upstream pressure may each apply a net bias on the inner sealing assembly 124 of the depicted valve 120 toward the closed position, which may be overcome with sufficient pressure of the control fluid in the control chamber 184. In at least one embodiment, the ability of the valve 120 to seal against downstream pressure at the outlet 130 is tested by pressuring the upstream side of the valve 120 through the inlet 128, as described above for valve 10.

The seal 102 (e.g., a metal ring gasket) is positioned to seal against opposing faces of the oilfield component 82 and the flange 96, as described above. An additional seal 220, which may be identical to the seal 102, is positioned to seal against the instrument flange 96 and the additional component 216. Control fluid may be pumped into a port 104 in the instrument flange 96 and through the cavity 106 into the control chamber 184 to actuate the piston 124 and control operation of the valve 120 in a manner like that described above for valve 10. For example, control fluid can be routed into the control chamber 184 to move the inner sealing assembly 124 to the open position to allow another fluid to be injected into a well through the valve 120 (via the port 84 and the bore 88) or to allow another fluid to flow out of a well through the valve 120 (again, via the port 84 and the bore 88).

The seals 102 and 220 prevent control fluid from leaking out of the cavity 106 past the instrument flange 96. If the instrument flange 96 is deflected and pulls away from the oilfield component 84 to create a gap or leak path 114 past the seal 102 (such as shown in FIG. 12), or if the flange 218 similarly separates from the instrument flange 96 and creates a gap or leak path past the seal 220, control fluid may leak from the control chamber 184 and cavity 106 such that the biasing forces move the inner sealing assembly 124 back to its closed position. As such, the valve 120 can close in response to loss of sealing integrity caused by separation of the instrument flange 96 from the oilfield component 82 or separation of the additional component 216 from the instrument flange 96. As with the valve 10, the valve 120 is a fail-safe closed valve; if the instrument flange 96 and the additional component 216 are broken off the oilfield component 82 (such as shown in FIG. 13), the inner sealing assembly 124 moves to, or remains in, the closed position to prevent fluid flow through the remaining portion of the valve 120.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus comprising:
   a valve including a hollow body and an inner sealing assembly positioned in the hollow body such that the inner sealing assembly can be moved between an open position and a closed position to selectively control flow along a flow path through the valve, wherein the inner sealing assembly includes a piston, the flow path includes a bore of the piston that allows flow through the piston, the valve is configured such that pressure within the valve from a fluid in the flow path within the valve biases the inner sealing assembly toward the closed position to stop flow through the valve, the inner sealing assembly includes a poppet coupled to the piston, the poppet includes a bore, and the flow path through the valve includes the bore of the poppet.

2. The apparatus of claim 1, wherein the valve is a hydraulically actuated valve.

3. The apparatus of claim 2, wherein the piston isolates a control chamber within the hollow body from the flow path through the valve, and the valve facilitates routing of hydraulic fluid into the control chamber to actuate the valve by driving the inner sealing assembly to the open position.

4. The apparatus of claim 1, wherein the poppet includes a sealing surface configured to seal against a mating surface of the valve when the inner sealing assembly is in the closed position.

5. The apparatus of claim 4, wherein the hollow body includes the mating surface of the valve against which the sealing surface of the poppet is configured to seal.

6. The apparatus of claim 4, wherein the valve includes a seat installed in the hollow body, and the seat includes the mating surface of the valve against which the sealing surface of the poppet is configured to seal.

7. The apparatus of claim 1, comprising an oilfield component having a port, wherein the valve is installed in the port of the oilfield component.

8. The apparatus of claim 7, wherein the port is an annulus outlet port of the oilfield component.

9. An apparatus comprising:
a valve including a hollow body and an inner sealing assembly positioned in the hollow body such that the inner sealing assembly can be moved between an open position and a closed position to selectively control flow along a flow path through the valve, wherein the inner sealing assembly includes a piston, the flow path includes a bore of the piston that allows flow through the piston, the valve is configured such that pressure within the valve from a fluid in the flow path within the valve biases the inner sealing assembly toward the closed position to stop flow through the valve, the inner sealing assembly includes a poppet coupled to the piston, the valve includes a cap coupled to an end of the hollow body, the poppet extends into the cap, and a spring installed in the cap applies a biasing force on the poppet toward the closed position.

10. The apparatus of claim 9, wherein the cap includes ports that allow flow between an interior of the valve and an exterior of the valve when the inner sealing assembly is in the open position.

11. An apparatus comprising:
a wellhead body including a main bore and a lateral port in fluid communication with the main bore;
a flange fastened to the wellhead body such that a through bore of the flange is arranged inline with the lateral port of the wellhead body;
a seal positioned between the wellhead body and the flange to seal against the wellhead body and the flange; and
a hydraulic valve installed in the lateral port of the wellhead body, the hydraulic valve including a hollow body and an inner sealing assembly positioned in the hollow body such that the inner sealing assembly can be moved between an open position and a closed position to selectively control flow along a flow path through the hydraulic valve, wherein the inner sealing assembly includes a piston, the flow path includes a bore of the piston that allows flow through the piston, and the hydraulic valve is configured such that pressure within the hydraulic valve from a fluid in the flow path within the hydraulic valve biases the inner sealing assembly toward the closed position to stop flow through the valve, the hydraulic valve also including a control chamber to receive a control fluid to actuate the hydraulic valve via the piston;
wherein the control chamber is in fluid communication with a cavity that is outside the hydraulic valve and that also receives the control fluid, the cavity includes at least a portion of the through bore of the flange outside the hydraulic valve, and the seal surrounds the cavity.

12. The apparatus of claim 11, wherein the control chamber, the cavity, and the seal are arranged such that, during operation, separation of the flange from the wellhead body in an amount sufficient to allow control fluid to leak out of the cavity past the seal positioned between the wellhead body and the flange causes depressurization of the cavity and the control chamber and closing of the hydraulic valve to prevent flow through the lateral port of the wellhead body.

13. The apparatus of claim 11, wherein the flange includes a port that extends through the flange to the through bore to facilitate injection of the control fluid into the control chamber of the hydraulic valve via the cavity.

14. The apparatus of claim 11, wherein the hydraulic valve extends from the lateral port of the wellhead body and into the through bore of the flange.

15. The apparatus of claim 11, wherein the flange is an instrument flange or a flange of a spool.

16. A method comprising:
receiving a first fluid in a hydraulic valve installed in a port of an oilfield component, the hydraulic valve including an inner sealing assembly arranged to be moved between a closed position that prevents flow of the first fluid through the hydraulic valve and an open position that allows flow of the first fluid past a sealing surface of the inner sealing assembly and through the hydraulic valve, wherein the first fluid received in the hydraulic valve biases the inner sealing assembly toward the closed position; and
receiving a second fluid in the hydraulic valve, wherein receiving the second fluid in the hydraulic valve includes receiving the second fluid in a control chamber of the hydraulic valve to drive the inner sealing assembly toward the open position and allow flow of the first fluid through the hydraulic valve.

17. The method of claim 16, wherein receiving the second fluid in the control chamber includes receiving the second fluid from a cavity that is within a bore of a flange and that is outside the hydraulic valve.

18. The method of claim 16, wherein the inner sealing assembly is biased closed by the first fluid whether the first fluid is received in the hydraulic valve from a first end of the hydraulic valve or from a second end of the hydraulic valve opposite the first end.

* * * * *